Figure 1:
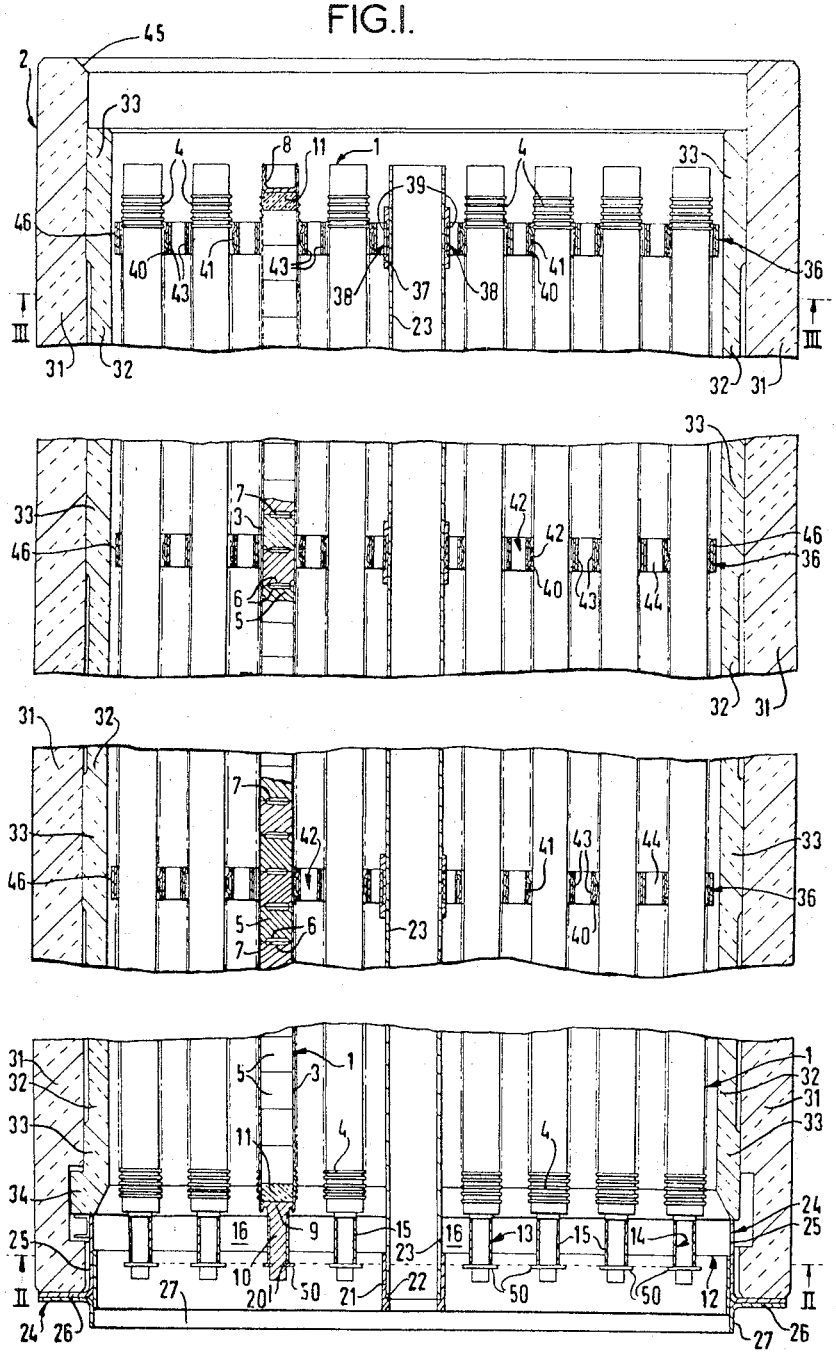

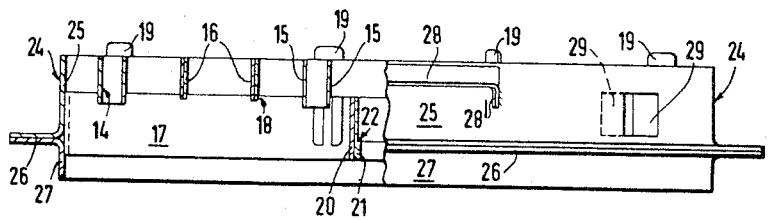
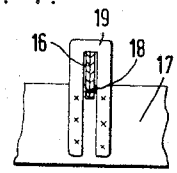
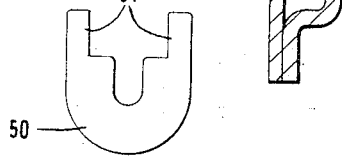
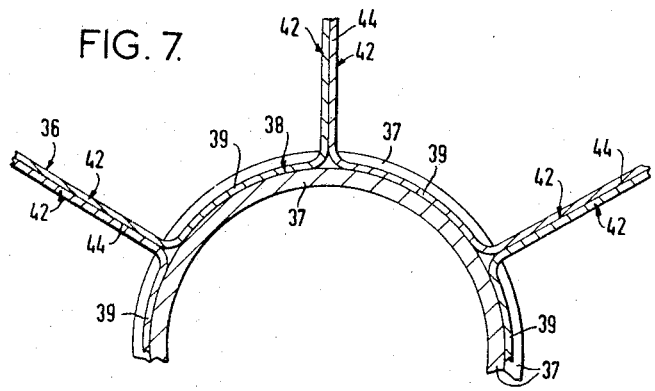

United States Patent Office 3,354,045
Patented Nov. 21, 1967

3,354,045
NUCLEAR REACTOR FUEL ELEMENTS
Derek Macfall, Winsford, Colin Edgar Butterfield, Westhoughton, and Roy Stuart Butterfield, Culcheth, Warrington, England, assignors to United Kingdom Atomic Energy Authority, London, England
Filed Nov. 26, 1965, Ser. No. 509,982
Claims priority, application Great Britain, Dec. 10, 1964, 50,344/64
10 Claims. (Cl. 176—78)

This invention relates to nuclear reactor fuel elements, and in particular to that kind of fuel element which has a cluster of parallel fuel rods disposed within a sleeve of structural material (which may be moderating material, for example graphite), the fuel element being intended to be positioned in a fuel element channel in the moderator of a nuclear reactor.

According to the invention, a nuclear reactor fuel element of the hereinbefore specified kind has its cluster of parallel fuel rods supported at their lower ends by support means, the support means also serving for independently supporting the sleeve at the lower end thereof, there being provided a member serving for lateral spacing of the fuel rods and disposed in the region of the upper ends thereof and optionally one or more of the lateral spacing members at one or more positions intermediate the upper lateral spacing member and the said support means, the lateral spacing member or members being secured in longitudinal positions by being mounted on a central longitudinally extending member which is itself mounted on the said support means, the fuel rods being slidable relative to the or each lateral spacing member and the or each lateral spacing member being slidable relative to the said sleeve.

The said central member is preferably tubular and may provide accommodation for a lifting member by means of which the fuel element or a stack of a plurality of fuel elements can be charged into or discharged from a fuel element channel of a nuclear reactor.

The said support means preferably comprises an annular member having a radial flange supporting the said sleeve, and an upper peripheral portion to which is secured a support grid engaged by and supporting the lower ends of the said fuel rods.

The said annular member preferably also has a lower peripheral portion adapted to engage within the upper end of the sleeve of a lower adjacent fuel element when the fuel elements are in operative position within a fuel element channel of a nuclear reactor, the said lower peripheral portion serving to laterally locate the adjacent fuel element and enable fuel elements to be stacked within a said channel.

There is preferably also provided an inner sleeve spaced from the said sleeve over most of its length, the inner sleeve being also supported by the said support means, and the or each lateral spacing member being relatively slidable therein.

The said support grid preferably comprises a fuel rod supporting portion and a load bearing portion which is secured to said annular member, the fuel rod supporting portion being engaged with and carried by said load bearing portion.

The lower ends of the fuel rods are preferably releasably secured in the fuel rod bearing portion of said support grid, so as to facilitate dismantling of the fuel element after irradiation.

The fuel rods are preferably undivided and of nearly the full length of the fuel element, and may each consist of a metallic sheath closed by end caps and containing a stack of fissile ceramic pellets.

The or each lateral spacing member may consist of a plurality of tubular members, each tubular member being secured to adjacent tubular members by strips so as to form a desired configuration of tubular members, and each tubular member having at least three equally spaced inward projections for contacting a fuel rod disposed therein.

Each tubular member may either be of constant diameter or be of varying cross-section along its length so that it is of minimum cross-section at its middle and of maximum cross-section at both its ends.

The said inner sleeve and the said support preferably have portions which are engaged with bayonet slots in the lower end portion of the outer sleeve so as to locate the inner and outer sleeves and the support means relative to one another and to restrain against axial movement therebetween.

In order that the invention may be fully understood and more readily carried into practice, a constructional example embodying the invention will now be described with reference to the accompanying drawings, wherein—

Figure 2:
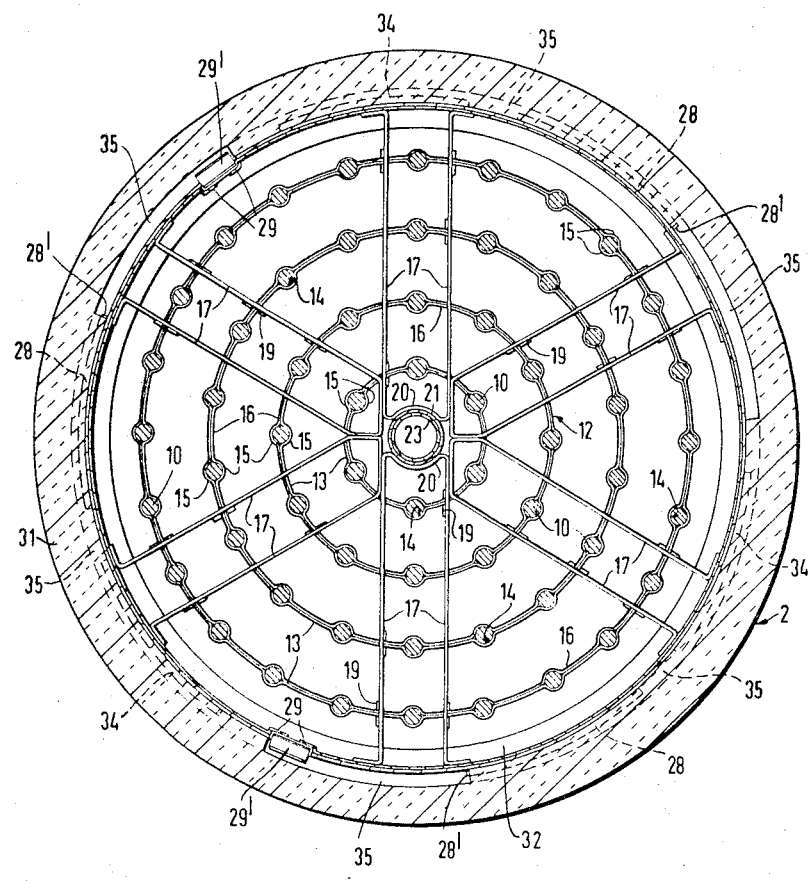
Figure 3:
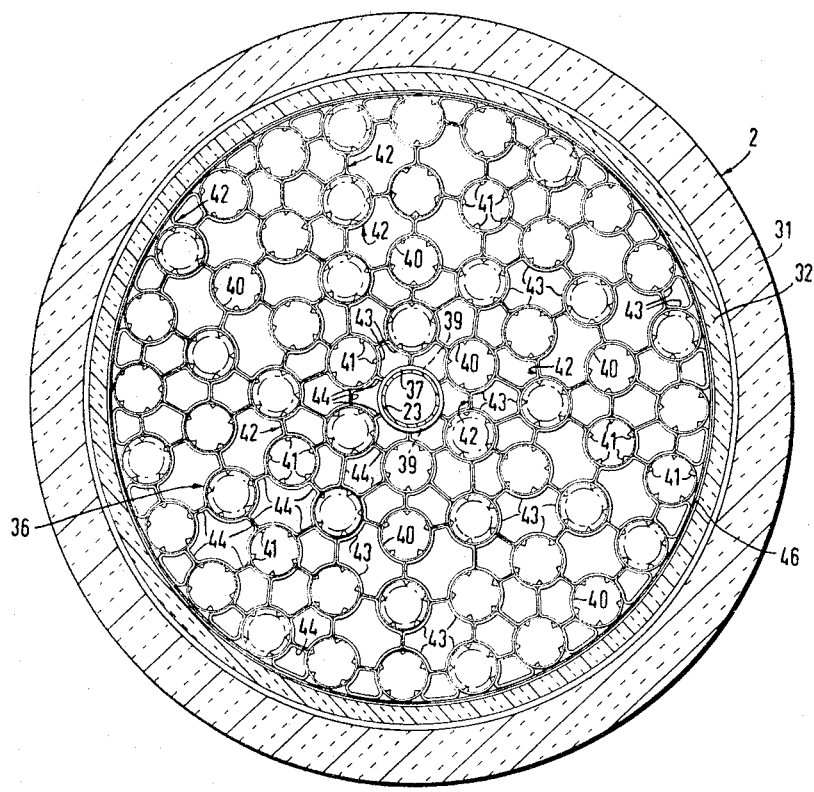

FIGURE 1 is a fragmentary side view in medial section of a nuclear reactor fuel element, FIGURE 2 is a plan view in section on line II—II of FIG. 1, FIGURE 3 is a view in section on line III—III of FIGURE 1, FIGURE 4 is a fragmentary side view and illustrates a detail, FIGURE 5 is a side view partly in section and illustrates another detail, FIGURE 6 is an enlarged side view in section of a further detail, FIGURE 7 is an enlarged part plan view in section of a still further detail, and FIGURE 8 is an enlarged plan view of still another detail.

Referring to the drawings, in the construction shown therein, there is illustrated a nuclear reactor fuel element suitable particularly but not exclusively for a gas-cooled graphite moderated nuclear reactor and having a cluster of fuel rods 1 disposed within a graphite sleeve assembly 2. The fuel rods 1 each consist of a tubular cylindrical metallic sheath 3 provided with external roughening in the form of either helically wrapped and secured wire or, as shown, helical or circumferential integral ribs 4, each sheath 3 containing a stack of cylindrical fissile ceramic (e.g. $UO_2$) pellets 5 each of which has a recess 6 at each of its ends, the recesses 6 of the pellets 5 cooperating when the pellets are stacked to form a succession of voids 7 along each fuel rod. An end cap 8 of dished form is welded to and closes the upper end of each sheath 3, and an end cap 9 having an extended central spigot 10 is welded to and closes the lower end of each sheath 3. A non-fissile heat insulating disc 11 (for example of alumina) is interposed between each of the end caps 8 and 9 and the adjacent end pellets 5 of the stack. The length of each fuel rod 1 is slightly less than that of the sleeve assembly 2, and the sheaths 3 extend without sub-division for the full length of the fuel rods.

The lower ends of the fuel rods 1 are supported by the fuel rod supporting portion 12 of a support grid, the portion 12 having four concentric rings 13 formed from bent double thickness strip material (for example stainless steel) edge on and shaped so as to provide openings 14 which are spaced equidistantly around the rings 13. The openings 14 are provided by opposed registering arcuate portions 15 of the strip material, and the remaining portions of the rings are provided by welding or brazing the double strip together to provide joining portions 16. The rings are carried by a load bearing portion of the support grid, such portion comprising six radial supports each consisting of two spaced limbs 17 each of strip material (for example stainless steel) edge on and disposed beneath the rings 13. The latter are located on the support limbs 17 by being engaged in shallow slots 18 and retained by inverted and elongated U-shaped tie members 19 spot-welded to the support limbs 17, as shown in FIGURE 4. Two pairs of opposed support limbs 17 have at their inner ends arcuate portions 20 (FIGURE 2) to which is welded or brazed a short tube 21 disposed with its axis at the centre of the grid 12, the tube 21 having an internal annular shoulder 22 upon which the end of an elongated central tube 23 is supported, the tube 23 being welded to the tube 21. The remaining pairs of support limbs 17 are secured by welding or brazing to one or other of the said opposed limbs 17 which have the arcuate portions 20 and adjacent pairs are also secured to one another, as shown in FIGURE 2.

The outer ends of the support limbs 17 are bent and are welded or brazed to the upper portion of an annular support member 24 formed from two flanged rings welded or brazed together in opposed manner along their flanges so as to provide an upper circumferential portion 25, a joint flange 26 and a lower circumferential portion 27 (see FIGURE 5, which is a side view, partly in medial section, of the support grid and support member 24). The portion 25 of the member 24 is provided with three part-annular channel section members 28 providing two spaced part-circumferential ribs, the members 28 being equally spaced around the periphery of the portion 25. Each member 28 also has a downwardly extending end lug 28' (FIGURES 2 and 5) at one end only. Between two of the three members 28, the material of the portion 25 is stamped out to provide two pairs of inwardly extending tongues 29 (FIGURES 5 and 2).

The fuel rods 1 are each secured to the portion 12 of the support grid, so as to be supported thereby, by the central spigot 10 of the lower end cap 9 being accommodated in the openings 14 of the grid 12. The lower end of each spigot 10 is annularly recessed at 20' (FIGURE 1) and this recess is engaged by a deformable clip 50 (shown enlarged in FIGURE 8) the wings 51 of which can be inwardly deformed by squeezing with a suitable tool, whereby the respective fuel rod 1 is retained in its supported position but can, by expanding the clip 50 by a suitable tool and withdrawing it from the recess 20', be removed upon dismantling of the fuel element after irradiation.

The flange 26 of the support member 24 carries an outer graphite sleeve 31 of the graphite sleeve assembly 2 with the lower end of the sleeve 31 supported thereby. An inner graphite sleeve 32 of the graphite sleeve assembly 2 is supported by the portion 25 of the support member 24. The inner graphite sleeve 32 is spaced from the outer sleeve 31 except where four peripheral portions 33 of the sleeve 32 of greater external diameter (one at each end and the other two equally spaced intermediately), contact the interior surface of the sleeve 31. The spaces between the sleeves 31 and 32 provide static gas gaps which assist in thermally insulating the sleeve 31 from the heat produced by the fuel rods during irradiation in a nuclear reactor.

The inner sleeve 32 also has three outwardly extending ribs 34 (FIGURES 1 and 2) equally spaced around its lower end and extending radially further than the lowermost of the portions 33. The ribs 34 engage, together with the members 28 of the support member 24, in a bayonet slot 35 in the internal lower end surface of the sleeve 31, which engagement serves to locate and secure against relative axial movement the sleeves 31 and 32 and the support member 24, together with the support grid 12 secured to the latter. When the sleeve 32 and support member 24 have been inserted in the lead to the bayonet slot 35 of the sleeve 31 then rotated to engage the ribs 34 and members 28 in the bayonet slot 35, locking in this position is accomplished by inserting a member 29' (shown enlarged in FIGURE 6 and in position in FIGURE 2) in register with the respective pair of tongues 29 and bending the latter towards one another to grip the member 29', which then engages one end of the bayonet slot 35 whilst the lug 28' engages the other end of the bayonet slot 35, thus locking the support member 24 in position.

To locate the upper ends of the fuel rods 1 in correct lateral spacing within the sleeves 31 and 32, a spacer grid 36 (FIGURES 1, 3 and 7) is mounted on the central tube 23, being secured thereto by a sleeve 37 welded to the tube 23 and having a peripheral recess 38 engaged with welding or brazing by arcuate portions 39 (FIGURE 7) of the spacer grid 36. The spacer grid has a plurality of tubular members 40 for example of stainless steel and each having a plurality (for example, as shown in FIGURE 3, five) of inward projections 41, best described by the term "dimples," equally spaced around the inner periphery of the respective tubular member 40 and formed by stamping. The tubular members 40 may each either be of constant diameter (as shown) or alternatively may be of varying cross-section along its length so that it is of minimum cross-section at its middle and of maximum cross-section at both its ends, thereby providing a "lead-in" and "lead-out" configuration to facilitate assembly. The tubular members 40 are secured to one another in the correct disposition to conform to the concentric pitching of the support grid 12 by web members 42 of strip material (for example stainless steel) edge on and each having arcuate portions 43 welded or brazed to the tubular members 40 and straight portions 44 extending between tubular members. The straight portions 44 are each welded or brazed to a registering portion 44 of an adjacent web member 42 so as to form joining portions of double thickness. The spacer grid 36 is completed by a ring 46 of strip material (for example, stainless steel) edge-on, to which arcuate portions of the outer web members 42 are welded or brazed.

The top spacer grid 36 is disposed slightly below the top of the fuel rods 1 and in register with the top peripheral portion 33 of the sleeve 32. Intermediate spacer grids 36 similar to the top spacer grid 36 are disposed in register with the two intermediate peripheral portions 33 of the sleeve 32. To accommodate for differential thermal expansion, the fuel rods 1 can move axially in the tubular members 40 of the spacer grids 36 (being contacted only by the inward projections 41) whilst being laterally located thereby. For the same purpose, the spacer grids 36 can move axially relative to the sleeve 32 as dictated by the amount of differential thermal expansion between the central tube 23 and the graphite sleeve 32.

The upper end of the graphite sleeve 32 terminates below the upper end of the graphite sleeve 31 so as to provide accommodation within the upper end portion of the sleeve 31 for the lower circumferential portion 27 of the support member 24 of an upper adjacent fuel element (not shown). The upper end of the sleeve 31 is chamfered at 45 to provide a lead-in for this purpose. Lateral location between adjacent fuel elements when stacked in a fuel element channel is thus provided. The weight of one fuel element is transferred to the lower adjacent fuel element through the flange 26 of the support member 24 engaging the top edge of the outer graphite sleeve of the lower adjacent fuel element. The lowermost fuel element is supported by its flange 26 engaging a support stool (not shown) in the bottom of the respective fuel channel.

The central tube 23 provides accommodation for a lifting and lowering rod (not shown) on to which a stack of fuel elements can be fitted, the lifting and lowering rod being secured to the support member 24 of the lowermost fuel element of the stack. Typically there may be six fuel elements in a stack.

The fuel element is advantageous in that the components are all supported from beneath by a single support member 24 and the weight of the components is transferred to lower fuel elements in the stack through the outer graphite sleeves. Thus the outer graphite sleeves of a stack of fuel elements are in compression not only during operation but also during lifting out of and lowering into a fuel element channel during refueling operations. This avoids putting the graphite sleeves into tension at any time during operation or refueling. The tensile properties of graphite are not as good as its properties when under compression.

Furthermore, the construction provides that differential expansions between different fuel rods of a fuel element do not result in strains either to the support and lateral location system or to the fuel rods themselves.

Advantage also accrues from the provision of a central tube for accommodating the lifting rod, because axial shuffling of irradiated fuel elements of a stack, which has to be done remotely, is simplified compared with earlier designs which involved threading the lifting rod through apertures in fuel element support grids which were well spaced.

Further advantage is attained in the relative simplicity of changing a fuel rod during the manufacturing stage if this proves necessary due to becoming damaged or otherwise by failure to comply with manufacturing or inspection standards. The bottom end only of the fuel rod needs to be released and then the fuel rod can be withdrawn axially upwardly and readily replaced by another. In earlier designs involving the welding of a fuel rod in position in supports at both ends of the rod, removal involved a complicated and time-consuming cutting-out process, and re-welding of a replacement rod was also necessary.

We claim:

1. A plurality of stacked nuclear reactor fuel elements, each of the kind having a cluster of parallel fuel rods disposed within a sleeve of structural material, comprising support means for supporting the cluster of parallel fuel rods at their lower ends and also for independently supporting said sleeve at its lower end, a tubular central longitudinal member mounted on said support means, and a lateral spacing member mounted on said central longitudinal member and disposed in the region of the upper ends of said fuel rods for laterally spacing said fuel rods, said fuel rods being slidable relative to said lateral spacing member and said lateral spacing member being slidable relative to said sleeve, and including a lifting member secured to the support means of the lowermost fuel element and disposed to extend through the tubular central longitudinal members of the stacked fuel elements, thereby forming a demountable assembly of fuel elements for charging into and discharging from a fuel element channel of a nuclear reactor by manipulation of said lifting member.

2. A nuclear reactor fuel element having a cluster of parallel fuel rods disposed within a sleeve of structural material, support means for supporting said fuel rods at their lower ends and comprising an annular member having an annular flange and an upper peripheral portion, said annular flange supporting said sleeve and said upper peripheral portion having secured thereto a support grid for supporting said fuel rods, a central longitudinal member mounted on said support means, and a lateral spacing member mounted on said central longitudinal member, disposed in the region of the upper ends of said fuel rods and slidable relative to said sleeve, the said fuel rods being slidable within said lateral spacing member.

3. A fuel element according to claim 2, including portions of said annular member for engagement in bayonet slots in the lower portion of said sleeve for location and the restraint of axial movement between said outer sleeve and said support means.

4. A fuel element according to claim 2, comprising at least one additional lateral spacing member mounted on said central longitudinal member and disposed intermediate said support means and said lateral spacing member which is disposed in the region of the upper ends of said fuel rods.

5. A fuel element according to claim 2, including a lower peripheral portion of said annular member for engaging within the upper end of a sleeve of a lower adjacent fuel element for mutual location when the fuel elements are stacked in operative position within a substantially vertical fuel element channel of a nuclear reactor.

6. A fuel element according to claim 2, including an inner sleeve spaced from said sleeve over most of its length and supported at its lower end by said support means, said lateral spacing member being relatively slidable in said inner sleeve.

7. A fuel element according to claim 2, wherein said support grid comprises a fuel rod supporting portion and a load bearing portion for engagement with and for carrying said fuel rod supporting portion, said load bearing portion being secured to said upper peripheral portion of said annular member.

8. A fuel element according to claim 7, wherein said fuel rods are each undivided and of nearly the full length of the fuel element, each consists of a stack of fissile pellets, a metallic sheath containing the stack of pellets, and end caps closing said sheath, and the lower end of each fuel rod is releasably secured in said fuel rod bearing portion of said support grid.

9. A fuel element according to claim 4, wherein each lateral spacing member comprises a plurality of tubular members, strips securing said tubular members together in a desired configuration, and at least three equally spaced inward projections of each tubular member for contacting a fuel rod disposed therein.

10. A fuel element according to claim 6, comprising portions of said inner sleeve and said support means for engagement with bayonet slots in the lower end portion of said (outer) sleeve for location and the restraint of axial movement between said inner sleeve, said (outer) sleeve and said support means.

References Cited

UNITED STATES PATENTS

| | | | |
|---|---|---|---|
| 3,164,529 | 1/1965 | Waine et al. | 176—78 X |
| 3,205,148 | 9/1965 | Waine et al. | 176—78 |
| 3,231,476 | 1/1966 | Thome | 176—78 |
| 3,240,681 | 3/1966 | Waine et al. | 176—78 |
| 3,278,388 | 10/1966 | Thome | 176—76 X |

L. DEWAYNE RUTLEDGE, *Primary Examiner.*

CARL D. QUARFORTH, *Examiner.*

M. J. SCOLNICK, *Assistant Examiner.*